(12) United States Patent
Chun et al.

(10) Patent No.: US 12,572,054 B2
(45) Date of Patent: Mar. 10, 2026

(54) CAMERA MODULE WITH A LENS DRIVER

(71) Applicant: SAMSUNG ELECTRO-MECHANICS CO., LTD., Suwon-si (KR)

(72) Inventors: Jibuem Chun, Suwon-si (KR); Hongjoo Lee, Suwon-si (KR); Namki Park, Suwon-si (KR); Jongwoo Hong, Suwon-si (KR); Jaehyung Han, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 184 days.

(21) Appl. No.: 18/353,470

(22) Filed: Jul. 17, 2023

(65) Prior Publication Data

US 2024/0272521 A1 Aug. 15, 2024

(30) Foreign Application Priority Data

Feb. 9, 2023 (KR) ........................ 10-2023-0017565

(51) Int. Cl.
*G03B 13/34* (2021.01)
*G02B 27/64* (2006.01)
(52) U.S. Cl.
CPC ........... *G03B 13/34* (2013.01); *G02B 27/646* (2013.01); *G03B 2205/0069* (2013.01)
(58) Field of Classification Search
None
See application file for complete search history.

(56) References Cited

U.S. PATENT DOCUMENTS

| | | | |
|---|---|---|---|
| 2007/0009243 A1* | 1/2007 | Takahashi | H04N 23/687 348/E5.046 |
| 2020/0153366 A1 | 5/2020 | I et al. | |
| 2020/0272027 A1* | 8/2020 | Kim | G03B 3/10 |
| 2021/0116787 A1 | 4/2021 | Hwang | |
| 2023/0209160 A1* | 6/2023 | Chun | H04N 23/54 348/374 |
| 2023/0341650 A1 | 10/2023 | Park | |

FOREIGN PATENT DOCUMENTS

| | | |
|---|---|---|
| JP | 2021-51277 A | 4/2021 |
| KR | 10-2007-0007710 A | 1/2007 |
| KR | 10-2019-0115624 A | 10/2019 |
| KR | 10-2019-0119856 A | 10/2019 |
| KR | 10-2020-0092560 A | 8/2020 |
| KR | 10-2021-0045252 A | 4/2021 |
| KR | 10-2021-0048037 A | 5/2021 |
| KR | 10-2022-0034612 A | 3/2022 |

OTHER PUBLICATIONS

Korean Office Action issued on Mar. 24, 2025, in corresponding Korean Patent Application No. 10-2023-0017565. (5pages in English, 5pages in Korean).
Korean Notice of Allowance issued on Nov. 11, 2025, in corresponding Korean Patent Application No. 10-2023-0017565. (2 pages in English, 2 pages in Korean).

* cited by examiner

*Primary Examiner* — Rodney E Fuller
(74) *Attorney, Agent, or Firm* — NSIP Law

(57) ABSTRACT

A coil, disposed on a substrate, extending in a first direction and a second direction different from the first direction, a magnet disposed to face the coil along a third direction perpendicular to the first direction and the second direction, and a sensing portion disposed to overlap an area outside an edge of the magnet, disposed along the first direction or the second direction, in the third direction.

17 Claims, 7 Drawing Sheets

DR2

DR1 ●→DR3

CAMERA MODULE WITH A LENS DRIVER

CROSS-REFERENCE TO RELATED APPLICATION

This application claims the benefit under 35 USC § 119(a) of Korean Patent Application No. 10-2023-0017565, filed on Feb. 9, 2023, in the Korean Intellectual Property Office, the entire disclosure of which is incorporated herein by reference for all purposes.

BACKGROUND

1. Field

The following disclosure relates to a camera module with a lens driver.

2. Description of the Related Art

With the remarkable development of information and communication technology and semiconductor technology, the supply and use of electronic devices are rapidly increasing. These electronic devices tend to provide various functions by convergence rather than staying in their typical unique domains.

Cameras are adopted in portable electronic devices such as smartphones, tablet PCs, and laptop computers and may include an auto focus (AF) function, an image stabilizer (IS) function, and a zoom function.

As an electronic device on which a camera module is mounted becomes thinner, the thickness of the camera module also tends to become thinner.

The above information disclosed in this Background section is only for enhancement of understanding of the background of the disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a coil, disposed on a substrate, extending in a first direction and a second direction different from the first direction, a magnet disposed to face the coil along a third direction perpendicular to the first direction and the second direction, and a sensing portion disposed to overlap an area outside an edge of the magnet, disposed along the first direction or the second direction, in the third direction.

The sensing portion may be disposed to face an edge parallel to the second direction of the magnet.

A first surface of the substrate may face the magnet and a second surface of the substrate may oppose the first surface of the substrate. The lens driver may further include a first yoke disposed on the second surface of the substrate.

The sensing portion may be disposed to face an edge parallel to the first direction of the magnet.

The coil may include a first coil and a second coil spaced apart each other along the first direction.

The magnet may include a first magnet portion and a second magnet portion with different magnetic poles, and the first magnet portion and the second magnet portion may be spaced apart from each other along the second direction.

The sensing portion may be disposed to overlap the first magnet portion and the second magnet portion along the first direction.

The magnet may include a first magnet portion and a second magnet portion having different magnetic poles.

The first magnet portion and the second magnet portion may be spaced apart from each other along the first direction.

The coil may include a first coil and a second coil spaced apart from each other along the first direction, the first magnet portion may face the first coil, and the second magnet portion may face the second coil.

The sensing portion may be disposed to overlap the first magnet portion and the second magnet portion along the second direction.

A third surface of the magnet may face the substrate, and the lens driver may further include a second yoke disposed on a fourth surface of the magnet opposing the third surface of the magnet.

A protrusion of second yoke may overlap the magnet along the second direction.

The coil may be a fine pattern (FP) coil with a pattern integrally formed on the substrate.

The coil may be embedded in the substrate.

The sensing portion may be disposed on a surface of the substrate facing the magnet.

A camera module may include a focus adjusting unit, including a focus adjusting driver configured to generate a driving force to move a lens barrel in an optical axis direction; and a shake correcting unit, including a guide member configured to guide a movement of the lens barrel and a shake correcting driver configured to generate a driving force to move the guide member in a direction perpendicular to the optical axis direction. The focus adjusting driver or the shake correcting driver may include the lens driver above.

The focus adjusting driver may include the lens driver.

The shake correcting driver may include the lens driver.

Other features and aspects will be apparent from the following detailed description, the drawings, and the claims.

Figure 1:
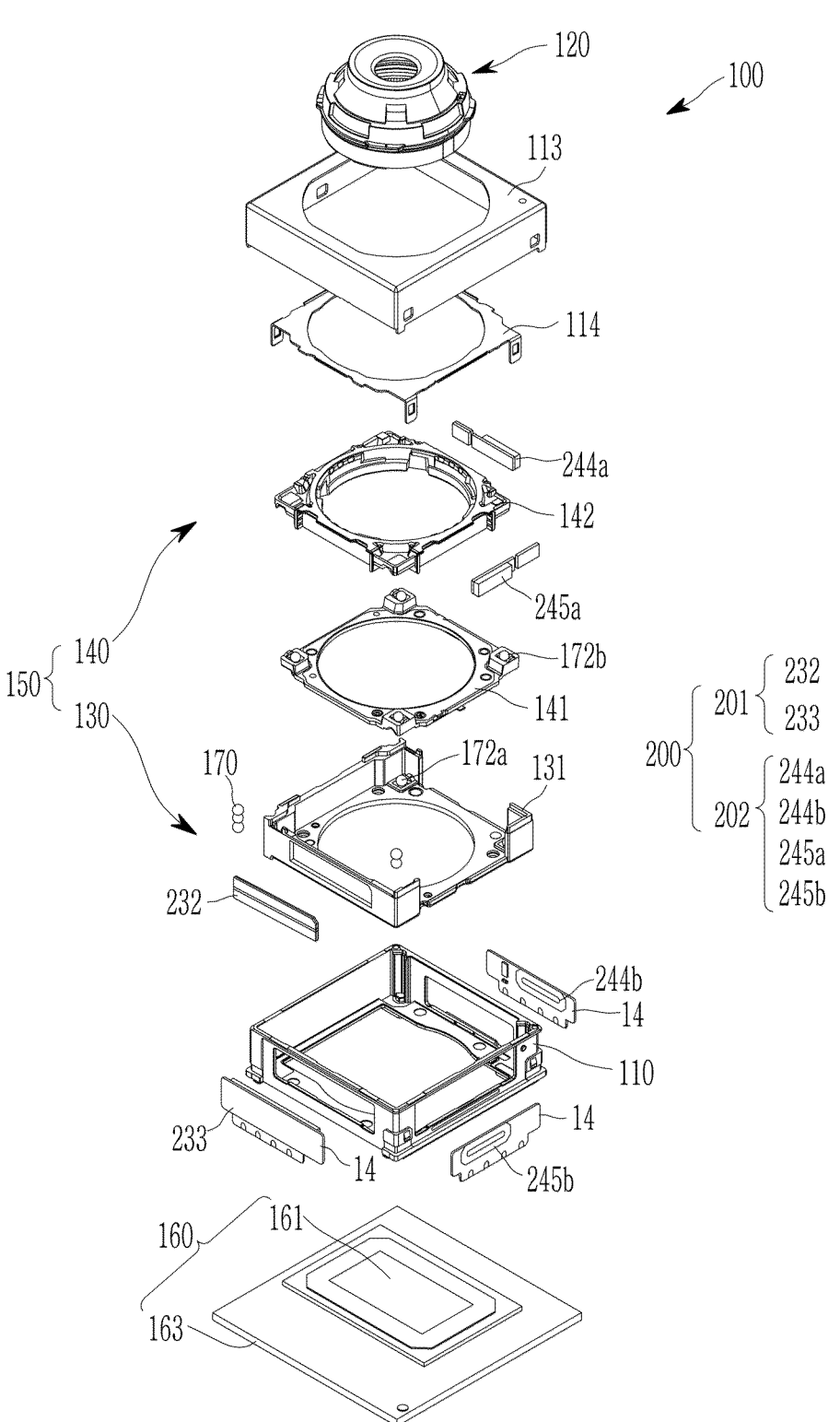
FIG. 1 illustrates a schematic exploded perspective view of a camera module according to one or more embodiments.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto.

Throughout the specification, when a component or element is described as being "on", "connected to," "coupled to," or "joined to" another component, element, or layer it may be directly (e.g., in contact with the other component or element) "on", "connected to," "coupled to," or "joined to" the other component, element, or layer or there may reasonably be one or more other components, elements, layers intervening therebetween. When a component or element is described as being "directly on", "directly connected to," "directly coupled to," or "directly joined" to another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

Unless otherwise defined, all terms, including technical and scientific terms, used herein have the same meaning as commonly understood by one of ordinary skill in the art to which this disclosure pertains specifically in the context on an understanding of the disclosure of the present application. Terms, such as those defined in commonly used dictionaries, are to be interpreted as having a meaning that is consistent with their meaning in the context of the relevant art and specifically in the context of the disclosure of the present application, and are not to be interpreted in an idealized or overly formal sense unless expressly so defined herein.

Further, throughout the specification, the phrase "in a plan view" or "on a plane" means viewing a target portion from the top, and the phrase "in a cross-sectional view" or "on a cross-section" means viewing a cross-section formed by vertically cutting a target portion from the side.

Referring to FIG. 1, a lens driver according to one or more embodiments will be described. FIG. 1 illustrates a schematic exploded perspective view of a camera module according to one or more embodiments.

Referring to FIG. 1, a camera module 100, according to one or more embodiments, may include a lens barrel 120, a lens driving device 150 that moves the lens barrel 120, an image sensor unit 160 that converts light incident through the lens barrel 120 into an electrical signal, a housing 110 accommodating the lens barrel 120 and the lens driving device 150, and a cover 113.

The lens driving device 150 is a device for moving the lens barrel 120, and may include a focus adjusting unit 130 for adjusting focus and a shake correcting unit 140 for correcting shake.

The lens barrel 120 may be accommodated in a lens holder 142 to be accommodated in the focus adjusting unit 130 together with a guide member 141.

The focus adjusting unit 130 may include a carrier 131 accommodating the lens barrel 120, and a focus adjusting driver generating driving force to move the lens barrel 120 and the carrier 131 in an optical axis direction.

The focus adjusting driver may include a first lens driver 201 including a magnet 232 and a coil 233. The magnet 232 of the first lens driver 201 may be mounted on one surface of the carrier 131, and the coil 233 may be formed in a substrate 14 to be mounted on the housing 110.

When power from a power source is applied to the coil 233, the carrier 131 may be moved in an optical axis direction by the electromagnetic force between the magnet 232 and the coil 233. Since the lens barrel 120 is accommodated in the carrier 131, the lens barrel 120 may also move in the optical axis direction by the movement of the carrier 131.

When the carrier 131 is moved, a first rolling member 170 may be disposed between the carrier 131 and the housing 110 to reduce friction between the carrier 131 and the housing 110. The first rolling member 170 may be in the form of a ball, and may be disposed at both sides of the magnet 232. A guide groove may be formed in the carrier 131 so that the first rolling member 170 is accommodated and guided in the optical axis direction.

The shake correcting unit 140 may include a guide member 141 for guiding movement of the lens barrel 120 and a shake correcting driver for generating driving force to move the guide member 141 in a direction perpendicular to the optical axis direction.

The guide member 141 and the lens holder 142 are inserted into the carrier 131 to be disposed in the optical axis direction, and may serve to guide the movement of the lens barrel 120.

The lens holder 142 may have a substantially quadrangular frame shape. Magnets 244a and 245a for hand-shake correction may be disposed on two adjacent side surfaces of the lens holder 142. A stopper 114 may be further disposed at an upper portion of the lens barrel 120 to prevent the lens holder 142 from being separated from an inner space of the carrier 131, and the stopper 114 may be combined with the carrier 131.

The shake correcting driver may include a second lens driver 202, and the second lens driver 202 may include magnets 244a and 245a and coils 244b and 245b. The magnets 244a and 245a of the second lens driver 202 may be mounted on the lens holder 142. The coils 244b and 245b, respectively facing the magnets 244a and 245a, may be formed on the substrate 14 to be fixedly mounted on the housing 110.

A plurality of second rolling members 172a and a plurality of third rolling members 172b may be provided to support the shake correcting unit 140. The plurality of second rolling members 172a and the plurality of third rolling members 172b may function to guide the lens holder 142 during a shake correcting process. In addition, the plurality of second rolling members 172a and the plurality of third rolling members 172b may also function to maintain a gap between the carrier 131 and the lens holder 142.

The image sensor unit 160 is a device configured to convert light incident through the lens barrel 120 into an electrical signal. For example, the image sensor unit 160 may include an image sensor 161 and a printed circuit board 163 connected to the image sensor 161, and may further include an infrared filter. The infrared filter may block light in an infrared region among light incident through the lens barrel 120.

The image sensor 161 may convert light incident through the lens barrel 120 into an electrical signal. For example, the image sensor 161 may be a charge coupled device (CCD) or a complementary metal-oxide semiconductor (CMOS). The electrical signal converted by the image sensor 161 may be outputted as an image through a display unit of a portable electronic device. The image sensor 161 may be fixed to the printed circuit board 163, and electrically connected to the printed circuit board 163.

The lens barrel 120 and the lens driving device 150 are accommodated in a space inside the housing 110. In an example, the housing 110 may have a box shape in which upper and lower portions are opened. The image sensor unit 160 may be disposed at a lower portion of the housing 110.

The cover 113 is combined with the housing 110 to cover an outer surface of the housing 110, and may serve to protect internal components of the camera module. In addition, the cover 113 may function to shield electromagnetic waves. For example, the cover 113 may shield electromagnetic waves so that electromagnetic waves generated by the camera module do not affect other electronic components in a portable electronic device.

In addition, since the portable electronic device is equipped with several electronic components in addition to the camera module, the cover 113 may shield electromagnetic waves so that electromagnetic waves generated from these electronic components do not affect the camera module. The cover 113 may be provided with a metallic material to be grounded to a ground pad provided in the printed circuit board 163, thereby shielding electromagnetic waves.

The coil 233 of the focus adjusting driver and the coils 244b and 245b of the shake correcting driver may be embedded in the substrate 14, so that they may be formed as parts of the substrate 14 itself. In addition, the coil 233 of the focus adjusting driver and the coils 244b and 245b of the shake correcting driver may be embedded in one substrate 14 together.

In addition, the focus adjusting driver and the shake correcting driver may further include a sensing portion for sensing the movement of the lens barrel 120, respectively. The sensing portions of the focus adjusting driver and the shake correcting driver may be in a form of an IC package that may be controlled by a controller included in the printed circuit board 163 connected to the image sensor 161.

Hereinafter, the lens driver 200, including the first lens driver 201 and the second lens driver 202 described above, will be described in more detail.

Figure 2:
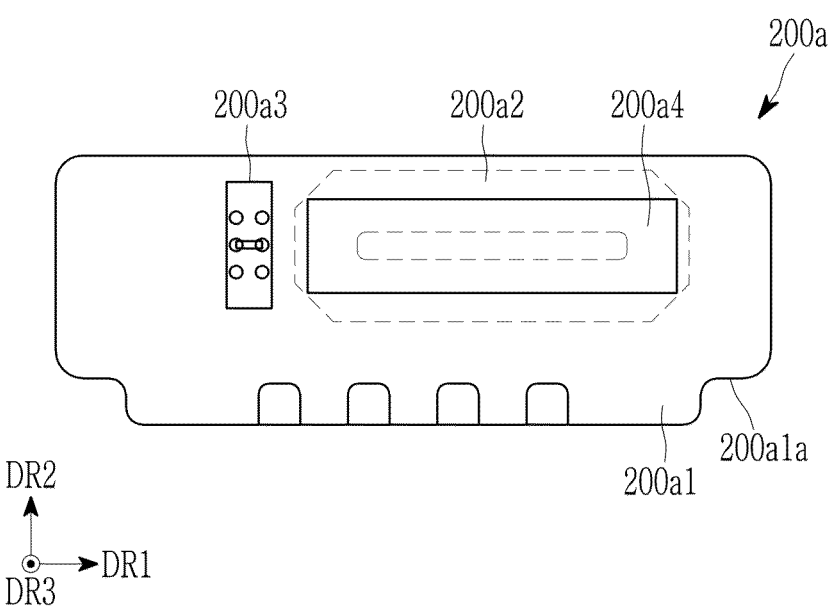
FIG. 2 illustrates a front view of a lens driver according to one or more embodiments.
Figure 3:
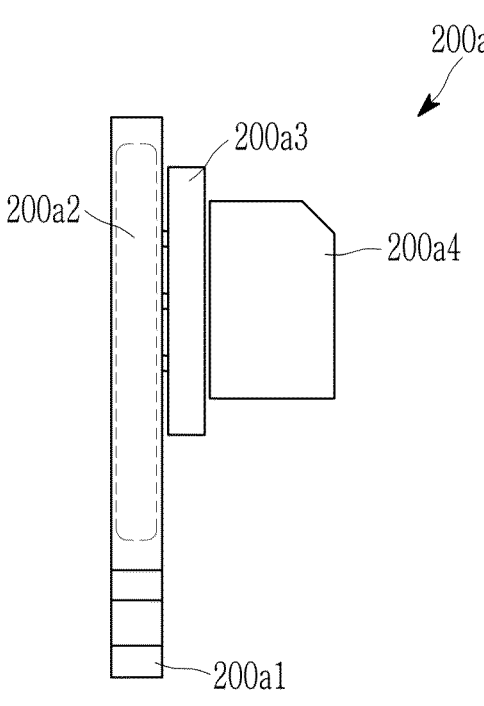
FIG. 3 illustrates a side view of the lens driver of FIG. 2.

Referring to FIG. 2 and FIG. 3, a lens driver according to one or more embodiments will be described. FIG. 2 illustrates a front view of a lens driver according to one or more embodiments, and FIG. 3 illustrates a side view of the lens driver of FIG. 2.

Referring to FIG. 2 and FIG. 3, a lens driver 200a, according to one or more embodiments, may include a substrate 200a1, a coil 200a2, a sensing portion 200a3, and a magnet 200a4.

The coil 200a2 may be disposed on the substrate 200a1 extending in a first direction DR1 and a second direction DR2. The coil 200a2 may be formed in the substrate 200a1 and may be embedded in the substrate 200a1. For example, the coil 200a2 may be a winding coil or a fine pattern (FP) coil embedded in the substrate 200a1. The FP coil may have an integrally formed pattern on the substrate. In addition, the FP coil may be formed in a plate shape so that it may be easily attached to the housing 110.

The substrate 200a1 may have a trench 200a1a formed at a lower portion of an edge of the substrate 200a1 parallel to the second direction DR2. The trench 200a1a of the substrate 200a1 may be disposed at both sides of the substrate 200a1.

The sensing portion 200a3 may be a sensor, such as a Hall sensor, and may be disposed outside the substrate 200a1. The sensing portion 200a3 may be disposed on one surface of the substrate 200a1 facing the magnet 200a4. The sensing portion 200a3 may not overlap the coil 200a2 along the first direction DR1 and the second direction DR2 where the substrate 200a1 extends. In addition, the sensing portion 200a3 may not overlap the coil 200a2 along a third direction DR3 perpendicular to the first direction DR1 and the second direction DR2. The sensing portion 200a3 may be disposed to overlap an area outside an edge of the magnet 200a4 disposed along the first direction DR1 or the second direction DR2 in the third direction DR3. For example, the sensing portion 200a3 may be disposed to overlap an area outside an edge of the magnet 200a4 disposed along the first direction DR1 in the third direction DR3. The sensing portion 200*a*3 may be disposed to face an edge parallel to the second direction DR2 of the magnet 200*a*4.

The magnet 200*a*4 may be disposed to face the coil 200*a*2 along the third direction DR3. In addition, the magnet 200*a*4 may be disposed to face the sensing portion 200*a*3 along the first direction DR1. The magnet 200*a*4 may have any one magnetic pole.

According to the lens driver 200*a*, in one or more embodiments, by forming the coil 200*a*2 in the substrate 200*a*1 and disposing the sensing portion 200*a*3 on the side surface of the magnet 200*a*4 facing the coil 200*a*2, while narrowing the area occupied by the lens driver 200*a*, the lens driving and sensing operations may be simultaneously performed.

Figure 4:
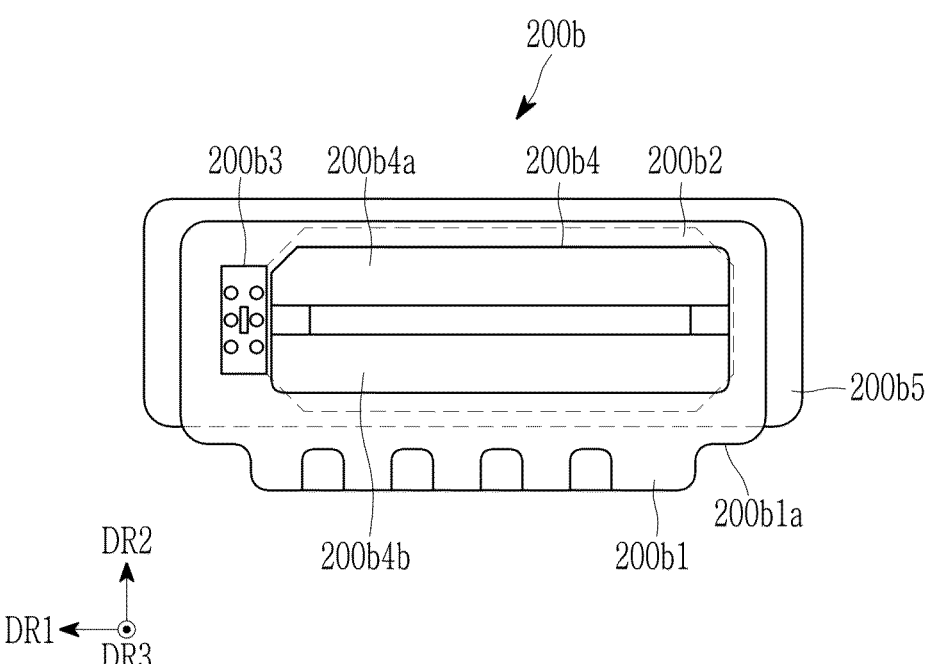
FIG. 4 illustrates a front view of a lens driver according to another embodiment.

Hereinafter, referring to FIG. 4 and FIG. 5, a lens driver according to another embodiment will be described. FIG. 4 illustrates a front view of a lens driver according to another embodiment, and FIG. 5 illustrates a side view of the lens driver of FIG. 4.

Figure 5:
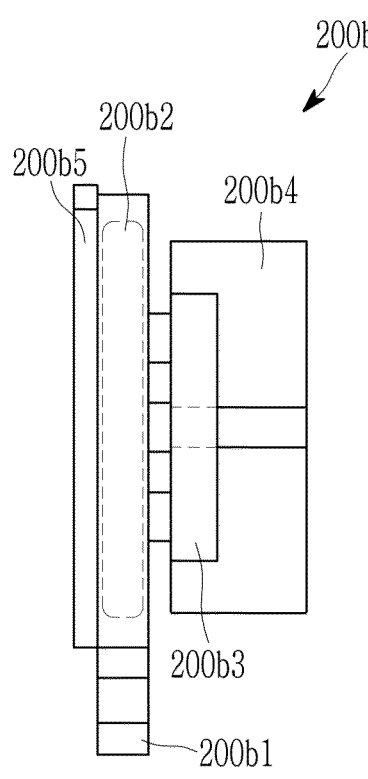
FIG. 5 illustrates a side view of the lens driver of FIG. 4.
Figure 5:
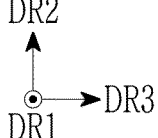

Referring to FIG. 4 and FIG. 5, a lens driver 200*b*, according to one or more embodiments, may include a substrate 200*b*1, a coil 200*b*2, a sensing unit 200*b*3, a magnet 200*b*4, and a yoke 200*b*5.

The coil 200*b*2 may be disposed on the substrate 200*b*1 extending in the first direction DR1 and the second direction DR2. The coil 200*b*2 may be formed in the substrate 200*b*1, and may be embedded in the substrate 200*b*1. In an example, the coil 200*b*2 may be a winding coil or a fine pattern (FP) coil embedded in the substrate 200*b*1. The FP coil may have an integrally formed pattern on the substrate. In addition, the FP coil may be formed in a plate shape, so it may be easily attached to the housing 110.

The substrate 200*b*1 may have a trench 200*b*1*a* formed at a lower portion of an edge of the substrate 200*b*1 parallel to the second direction DR2. The trench 200*b*1*a* of the substrate 200*b*1 may be disposed at both sides of the substrate 200*b*1.

The sensing portion 200*b*3 may be a sensor such as a Hall sensor, and may be disposed outside the substrate 200*b*1. The sensing portion 200*b*3 may be disposed on one surface of the substrate 200*b*1 facing the magnet 200*b*4. The sensing portion 200*b*3 may not overlap the coil 200*b*2 along the first direction DR1 and the second direction DR2 where the substrate 200*b*1 extends. In addition, the sensing portion 200*b*3 may not overlap the coil 200*b*2 along the third direction DR3 perpendicular to the first direction DR1 and the second direction DR2. The sensing portion 200*b*3 may be disposed to overlap an area outside an edge of the magnet 200*b*4 disposed along the first direction DR1 or the second direction DR2 in the third direction DR3. For example, the sensing portion 200*b*3 may be disposed to overlap an area outside an edge of the magnet 200*b*4 disposed along the first direction DR1 in the third direction DR3. The sensing portion 200*a*3 may be disposed to face an edge parallel to the second direction DR2 of the magnet 200*a*4.

The magnet 200*b*4 may be disposed to face the coil 200*b*2 along the third direction DR3. In addition, the magnet 200*b*4 may be disposed to face the sensing portion 200*b*3 along the first direction DR1.

The magnet 200*b*4 may include a first magnet portion 200*b*4*a* and a second magnet portion 200*b*4*b*, each facing the coil 200*b*2 and having different magnetic poles. The first magnet portion 200*b*4*a* and the second magnet portion 200*b*4*b* may be disposed to be separated from each other along the second direction DR2. The sensing portion 200*b*3 may be disposed to overlap the first magnet portion 200*b*4*a* and the second magnet portion 200*b*4*b* along the first direction DR1.

The yoke 200*b*5 may be disposed on the other surface opposite to one surface of the substrate 200*b*1 facing the magnet 200*b*4. For example, the substrate 200*b*1 includes a first surface facing the magnet 200*b*4 and a second surface opposite to the first surface, and the yoke 200*b*5 may be disposed on the second surface of the substrate 200*b*1. The yoke 200*b*5 may have a flat surface.

According to the lens driver 200*b* according to one or more embodiments, by forming the coil 200*b*2 in the substrate 200*b*1 and disposing the sensing portion 200*b*3 on the side surface of the magnet 200*b*4 facing the coil 200*b*2, while narrowing the area occupied by the lens driver 200*b*, the lens driving and sensing operations may be simultaneously performed.

Figure 6:
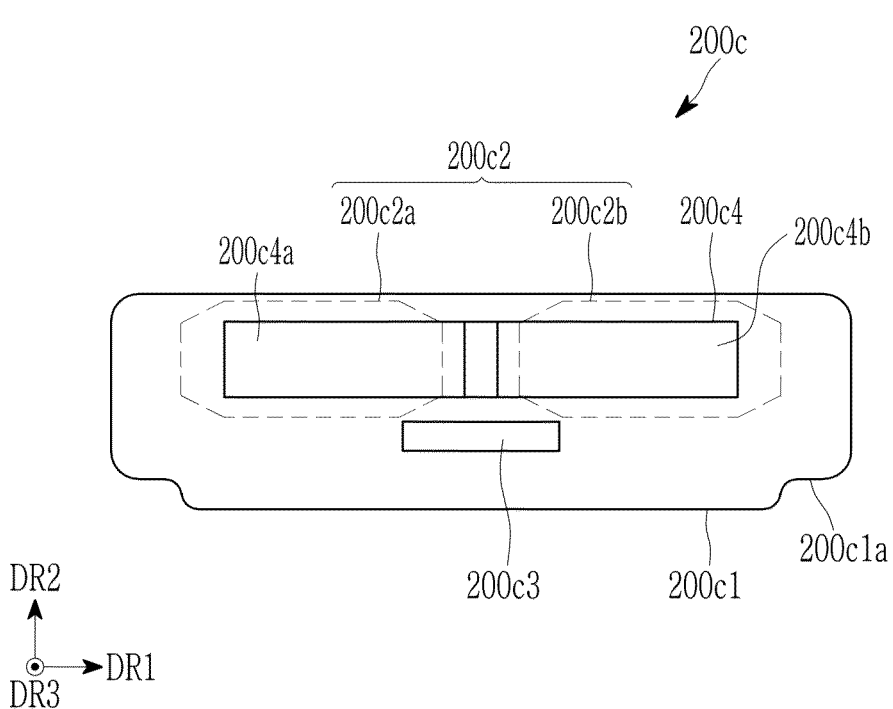
FIG. 6 illustrates a front view of a lens driver according to another embodiment.
Figure 7:
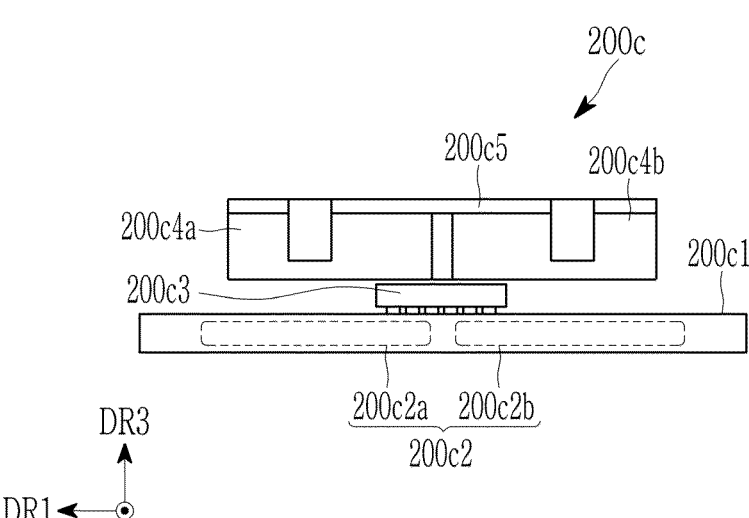
FIG. 7 illustrates a side view of the lens driver of FIG. 6.

Hereinafter, referring to FIG. 6 and FIG. 7, a lens driver according to another embodiment will be described. FIG. 6 illustrates a front view of a lens driver according to another embodiment, and FIG. 7 illustrates a side view of the lens driver of FIG. 6.

Referring to FIG. 6 and FIG. 5, a lens driver 200*c*, according to one or more embodiments, may include a substrate 200*c*1, a coil 200*c*2, a sensing unit 200*c*3, a magnet 200*c*4, and a yoke 200*c*5.

The coil 200*c*2 may be disposed on the substrate 200*c*1 extending in the first direction DR1 and the second direction DR2. The coil 200*c*2 may be formed in the substrate 200*c*1, and may be embedded in the substrate 200*c*1. For example, the coil 200*c*2 may be a winding coil embedded in the substrate 200*c*1 or a fine pattern (FP) coil. The FP coil may have an integrally formed pattern on the substrate. In addition, the FP coil may be formed in a plate shape so that it may be easily attached to the housing 110. The coil 200*c*2 may include a first coil 200*c*2*a* and a second coil 200*c*2*b* that are spaced apart from each other along the first direction DR1.

The substrate 200*c*1 may have a trench 200*c*1*a* formed at a lower portion of an edge of the substrate 200*c*1 parallel to the second direction DR2. The trench 200*c*1*a* of the substrate 200*c*1 may be disposed at both sides of the substrate 200*c*1.

The sensing portion 200*c*3 may be a sensor, such as a Hall sensor, and may be disposed outside the substrate 200*c*1. The sensing portion 200*c*3 may be disposed on one surface of the substrate 200*c*1 facing the magnet 200*c*4. The sensing portion 200*c*3 may not overlap the coil 200*c*2 along the first direction DR1 and the second direction DR2 where the substrate 200*c*1 extends. In addition, the sensing portion 200*c*3 may not overlap the coil 200*c*2 along the third direction DR3 perpendicular to the first direction DR1 and the second direction DR2. The sensing portion 200*c*3 may be disposed to overlap an area outside an edge of the magnet 200*c*4 disposed along the first direction DR1 or the second direction DR2 in the third direction DR3. For example, the sensing portion 200*c*3 may be disposed to overlap an area outside an edge of the magnet 200*c*4 disposed along the second direction DR2 in the third direction DR3. The sensing portion 200*c*3 may be disposed to face an edge parallel to the first direction DR1 of the magnet 200*c*4.

The magnet 200*c*4 may be disposed to face the coil 200*c*2 along the third direction DR3. In addition, the magnet 200*c*4 may be disposed to face the sensing portion 200*c*3 along the second direction DR2.

The magnet 200*c*4 may include a first magnet portion 200*c*4*a* and a second magnet portion 200*c*4*b*, each facing the coil 200*c*2 and having different magnetic poles. The first magnet portion 200*c*4*a*, and the second magnet portion 200*c*4*b* may be disposed to be separated from each other along the first direction DR1. The first magnet portion 200*c*4*a* may face the first coil 200*c*2*a*, and the second magnet portion 200*c*4*b* may face the second coil 200*c*2*b*. The sensing portion 200*c*3 may be disposed to overlap the first magnet portion 200*c*4*a* and the second magnet portion 200*c*4*b* along the second direction DR2.

The yoke 200*c*5 may fix the first magnet portion 200*c*4*a* and the second magnet portion 200*c*4*b* of the magnet 200*c*4. The yoke 200*c*5 may be disposed on the other surface opposite to one surface of the magnet 200*c*4 facing the substrate 200*c*1. The magnet 200*c*4 includes a third surface facing the substrate 200*c*1 and a fourth surface opposite to the third surface, and the yoke 200*c*5 may be disposed on the fourth surface of the magnet 200*c*4. The yoke 200*c*5 may have a flat surface. The yoke 200*c*5 may include a protrusion overlapping the magnet 200*c*4 along the second direction DR2.

According to the lens driver 200*c* according to one or more embodiments, by forming the coil 200*c*2 in the substrate 200*c*1 and disposing the sensing portion 200*c*3 on the side surface of the magnet 200*c*4 facing the coil 200*c*2, while narrowing the area occupied by the lens driver 200*c*, the lens driving and sensing operations may be simultaneously performed.

According to the embodiments, a lens driver with a relatively thin profile is described to maintain the driving force for moving a lens with a relatively simple process.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A lens driver comprising:
a coil, disposed on a substrate, extending in a first direction and a second direction different from the first direction;
a magnet disposed to face the coil along a third direction perpendicular to the first direction and the second direction; and
a sensing portion disposed to overlap and extend over areas outside edges of the magnet, disposed along the first direction or the second direction, in the third direction,
wherein a first surface of the substrate faces the magnet and a second surface of the substrate opposes the first surface of the substrate, and the lens driver further includes a first yoke disposed on the second surface of the substrate.

2. The lens driver of claim 1, wherein
the sensing portion is disposed to face an edge of the magnet parallel to the second direction.

3. The lens driver of claim 1, wherein
the sensing portion is disposed to face an edge of the magnet parallel to the first direction.

4. The lens driver of claim 1, wherein
the coil includes a first coil and a second coil spaced apart from each other along the first direction.

5. The lens driver of claim 1, wherein
the magnet includes a first magnet portion and a second magnet portion with different magnetic poles, and
the first magnet portion and the second magnet portion are spaced apart from each other along the second direction.

6. The lens driver of claim 5, wherein
the sensing portion is disposed to overlap the first magnet portion and the second magnet portion along the first direction.

7. The lens driver of claim 1, wherein
the magnet includes a first magnet portion and a second magnet portion with different magnetic poles, and
the first magnet portion and the second magnet portion are spaced apart from each other along the first direction.

8. The lens driver of claim 7, wherein
the coil includes a first coil and a second coil spaced apart from each other along the first direction, and
the first magnet portion faces the first coil and the second magnet portion faces the second coil.

9. The lens driver of claim 7, wherein
the sensing portion is disposed to overlap the first magnet portion and the second magnet portion along the second direction.

10. The lens driver of claim 1, wherein
a third surface of the magnet faces the substrate, and
the lens driver further includes a second yoke disposed on a fourth surface of the magnet opposing the third surface of the magnet.

11. The lens driver of claim 10, wherein
a protrusion of the second yoke overlaps the magnet along the second direction.

12. The lens driver of claim 1, wherein
the coil is a fine pattern (FP) coil with a pattern integrally formed on the substrate.

13. The lens driver of claim 1, wherein
the coil is embedded in the substrate.

14. The lens driver of claim 1, wherein
the sensing portion is disposed on a surface of the substrate facing the magnet.

15. A camera module comprising:
a focus adjusting unit, comprising a focus adjusting driver configured to generate a driving force to move a lens barrel in an optical axis direction; and
a shake correcting unit, comprising a guide member configured to guide a movement of the lens barrel and a shake correcting driver configured to generate a driving force to move the guide member in a direction perpendicular to the optical axis direction,
wherein the focus adjusting driver or the shake correcting driver comprises the lens driver of claim 1.

16. The camera module of claim 15, wherein the focus adjusting driver comprises the lens driver.

17. The camera module of claim 16, wherein the shake correcting driver comprises the lens driver.

* * * * *